(12) United States Patent
Camara et al.

(10) Patent No.: US 11,572,924 B1
(45) Date of Patent: Feb. 7, 2023

(54) CENTRIFUGAL MASS ASSEMBLY FOR A CLUTCH

(71) Applicant: Schaeffler Technologies AG & Co. KG, Herzogenaurach (DE)

(72) Inventors: Guilherme Camara, Sorocaba (BR); Alexandre Benedetti Rossi, Sorocaba (BR); Wellyngton Ferreira, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/590,073

(22) Filed: Feb. 1, 2022

(51) Int. Cl.
    *F16D 43/14* (2006.01)
(52) U.S. Cl.
    CPC ..................... *F16D 43/14* (2013.01)
(58) Field of Classification Search
    CPC .................. F16D 43/14; F16D 43/18
    See application file for complete search history.

(56) References Cited

U.S. PATENT DOCUMENTS

| | | | | |
|---|---|---|---|---|
| 2,703,163 | A * | 3/1955 | Millar | F16D 43/18 |
| | | | | 192/105 BA |
| 3,565,224 | A * | 2/1971 | Argereu | F16D 43/18 |
| | | | | 192/105 BA |
| 4,625,849 | A * | 12/1986 | Gommel | B27B 17/10 |
| | | | | 192/76 |
| 8,881,622 | B2 * | 11/2014 | Maienschein | F16F 15/145 |
| | | | | 74/574.2 |
| 2020/0096060 | A1 | 3/2020 | Heck | |
| 2020/0132136 | A1 | 4/2020 | Heuberger et al. | |
| 2021/0285506 | A1 | 9/2021 | Heuberger | |

FOREIGN PATENT DOCUMENTS

| | | |
|---|---|---|
| DE | 102017110717 A1 | 11/2018 |
| DE | 102017115212 A1 | 1/2019 |
| DE | 102018106775 A1 | 9/2019 |
| DE | 102018122102 A1 | 3/2020 |
| DE | 102019133648 A1 | 6/2021 |

* cited by examiner

*Primary Examiner* — Huan Le

(57) ABSTRACT

A centrifugal mass assembly for a clutch includes a central axis, an arc-shaped centrifugal mass with a pair of radially offset apertures, and a guidance plate with a first annular ring. The first annular ring includes a pair of radially offset protrusions disposed in respective ones of the pair of radially offset apertures, or the first annular ring includes a radially extending slot and the arc-shaped centrifugal mass has a pair of pins fixed in respective ones of the pair of radially offset apertures and disposed in the radially extending slot. In an example embodiment, the first annular ring has a raised portion and the pair of radially offset protrusions or the radially extending slot is disposed on the raised portion.

18 Claims, 3 Drawing Sheets

CENTRIFUGAL MASS ASSEMBLY FOR A CLUTCH

TECHNICAL FIELD

The present disclosure relates generally to a clutch, and more specifically to a centrifugal mass assembly for a clutch.

BACKGROUND

Centrifugal clutches are known. Examples are shown in commonly-assigned United States Patent Application Publication Nos. 2020/0096060 for CENTRIFUGAL CLUTCH HAVING CENTRIFUGAL MASSES WHICH ARE MANUFACTURED WITHOUT CUTTING to Heck and US 2020/0132136 for CENTRIFUGAL CLUTCH FOR A DRIVE TRAIN OF A MOTOR VEHICLE, COMPRISING AT LEAST ONE FIXING ELEMENT FOR A COUNTER-PRESSURE PLATE to Heuberger et al., hereby incorporated by reference as if set forth fully herein.

SUMMARY

Example embodiments broadly comprise a centrifugal mass assembly for a clutch including a central axis, an arc-shaped centrifugal mass with a pair of radially offset apertures, and a guidance plate with a first annular ring. The first annular ring includes a pair of radially offset protrusions disposed in respective ones of the pair of radially offset apertures, or the first annular ring includes a radially extending slot and the arc-shaped centrifugal mass has a pair of pins fixed in respective ones of the pair of radially offset apertures and disposed in the radially extending slot. In an example embodiment, the first annular ring has a raised portion and the pair of radially offset protrusions or the radially extending slot is disposed on the raised portion.

In some example embodiments, the guidance plate has an inner cylindrical protrusion on a radially inner side of the first annular ring, and an outer cylindrical protrusion on a radially outer side of the first annular ring. In an example embodiment, the inner cylindrical protrusion and the outer cylindrical protrusion extend axially towards the arc-shaped centrifugal mass. In some example embodiments, the guidance plate has a second annular ring extending radially inward from the inner cylindrical protrusion. In an example embodiment, the second annular ring has a plurality of holes for fixing the centrifugal mass assembly to a combustion engine.

In an example embodiment, the arc-shaped centrifugal mass is radially displaceable relative to the guidance plate. In an example embodiment, the centrifugal mass assembly has exactly three arc-shaped centrifugal masses circumferentially arranged about the central axis. In some example embodiments, the arc-shaped centrifugal mass has an arc length, and the pair of radially offset apertures are arranged at a midpoint of the arc length. In an example embodiment, the arc-shaped centrifugal mass has a pair of cutouts arranged on opposite circumferential sides of the pair of radially offset apertures. In some example embodiments, the arc-shaped centrifugal mass has circumferentially distal ends with radially inner notches. In an example embodiment, the guidance plate has cutouts axially aligned with the radially inner notches.

In some example embodiments, the first annular ring includes the pair of radially offset protrusions disposed in respective ones of the pair of radially offset apertures, and each one of the pair of radially offset protrusions is a tab formed from a portion of the first annular ring and bent to extend in an axial direction. In an example embodiment, prior to being bent, a first one of the pair of radially offset protrusions is formed as a first tab extending radially inwards, and a second one of the pair of radially offset protrusions is formed as a second tab extending radially outwards. In an example embodiment, the first annular ring includes the pair of radially offset protrusions disposed in respective ones of the pair of radially offset apertures, the arc-shaped centrifugal mass has a thickness, and the pair of radially offset protrusions have respective lengths extending axially from the first annular ring that are less than the thickness.

In an example embodiment, the first annular ring includes the radially extending slot, the guidance plate has an outer cylindrical protrusion on a radially outer side of the first annular ring, and the radially extending slot extends through the outer cylindrical protrusion. In an example embodiment, the arc-shaped centrifugal mass includes the pair of pins fixed in respective ones of the pair of radially offset apertures, disposed in the radially extending slot, and extending axially beyond the first annular ring. In an example embodiment, the arc-shaped centrifugal mass includes the pair of pins fixed in respective ones of the pair of radially offset apertures and disposed in the radially extending slot, the first annular ring has a thickness, and the pair of pins have respective lengths extending axially away from the arc-shaped centrifugal mass that are greater than the thickness.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
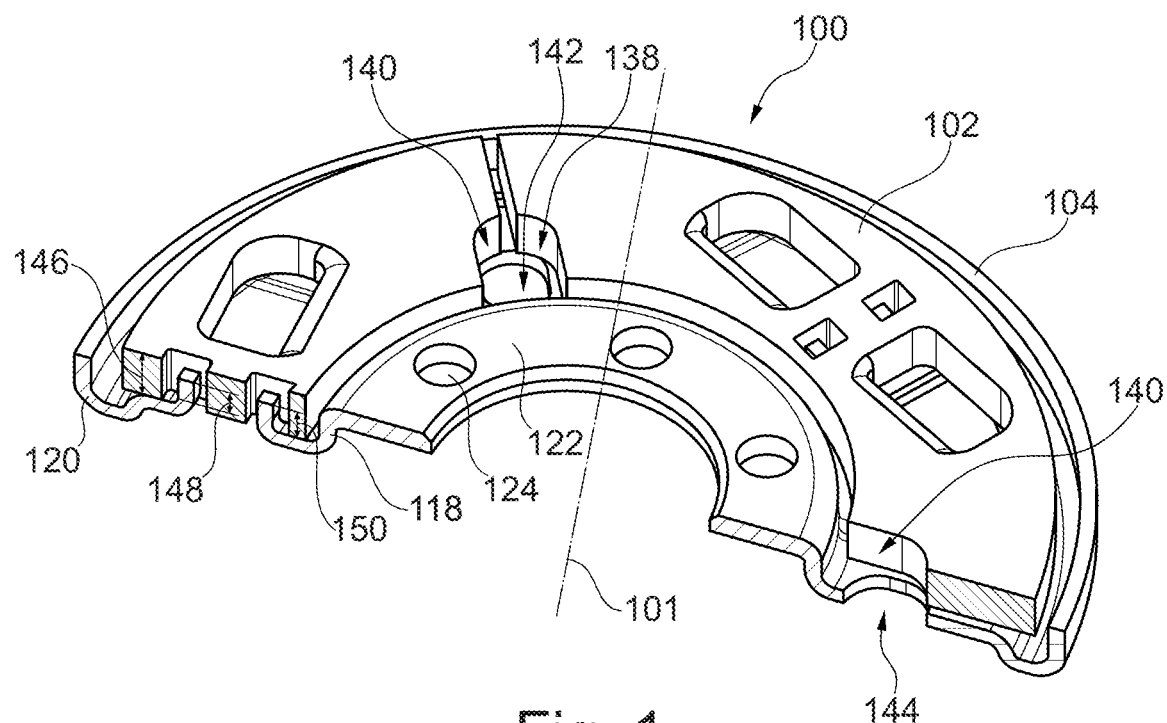
FIG. 1 illustrates a sectioned perspective view of a centrifugal mass assembly according to a first embodiment.
Figure 2:
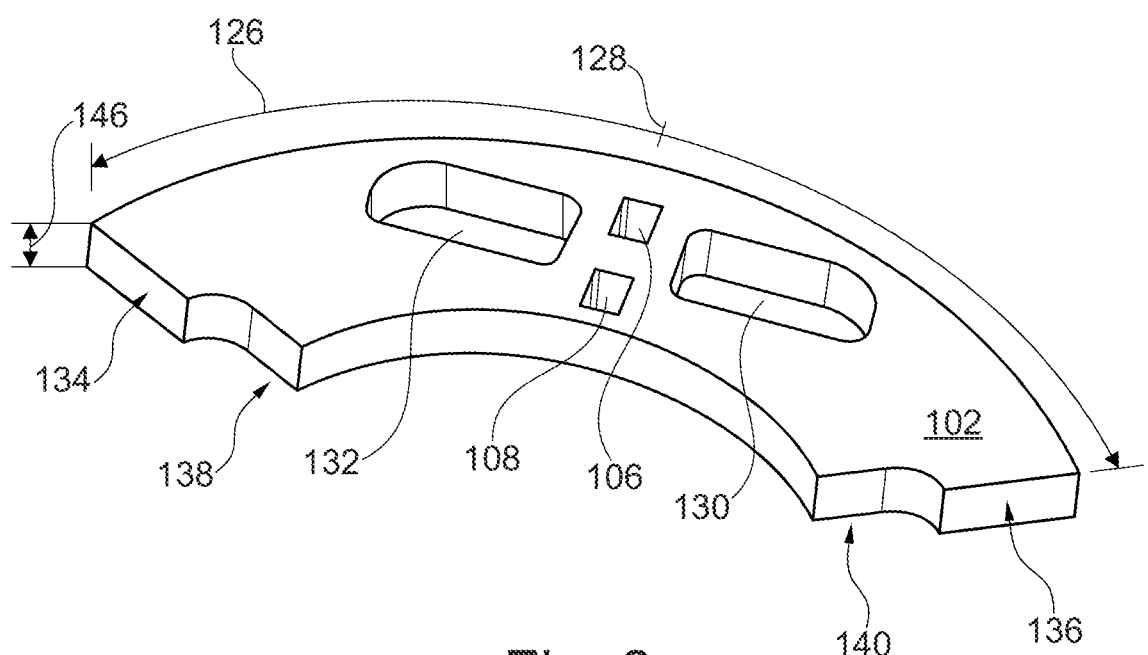
FIG. 2 illustrates a perspective view of an arc-shaped centrifugal mass for the centrifugal mass assembly of FIG. 1.
Figure 3:
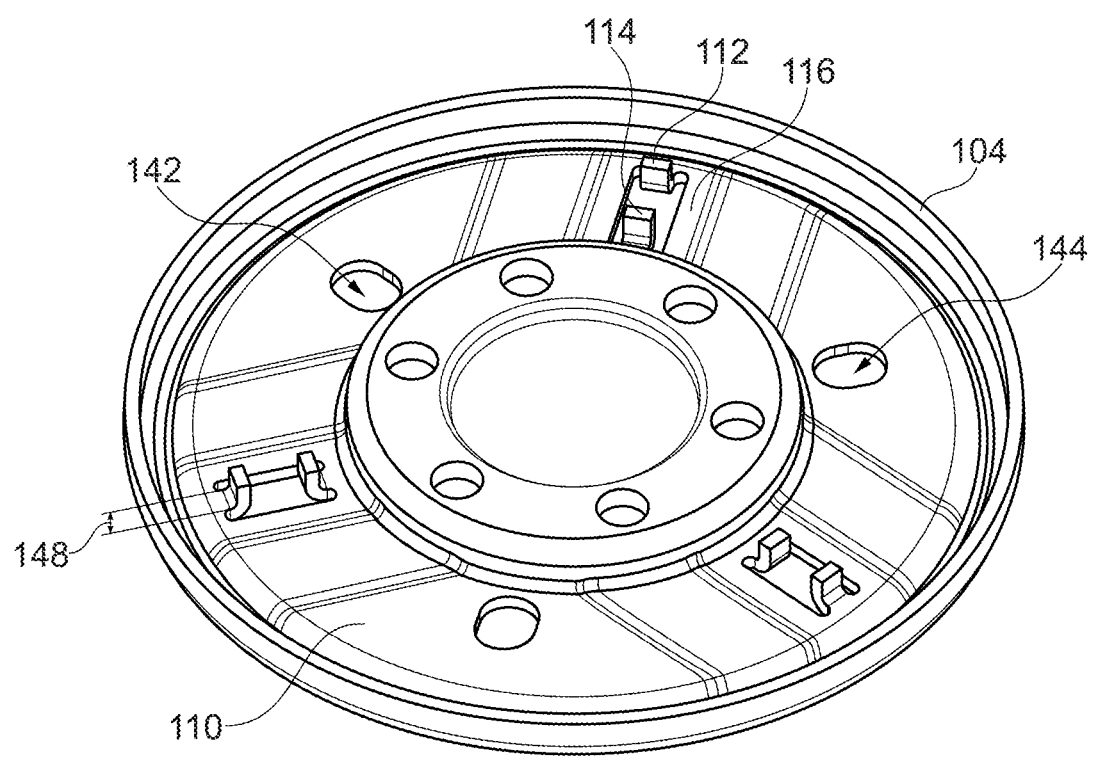
FIG. 3 illustrates a perspective view of a guide plate for the centrifugal mass assembly of FIG. 1.

The following description is made with reference to FIGS. 1-3. 1. FIG. 1 illustrates a sectioned perspective view of centrifugal mass assembly 100. FIG. 2 illustrates a perspective view of arc-shaped centrifugal mass 102 for centrifugal mass assembly 100 of FIG. 1. FIG. 3 illustrates a perspective view of guide plate 104 for centrifugal mass assembly 100 of FIG. 1. Centrifugal mass assembly 100 may be used with a clutch as is known in the art. Centrifugal mass assembly 100 includes central axis 101. Throughout the description of assembly 100, the terms "radially", "axially" and "circumferentially" should be interpreted with regard to central axis 101. Assembly 100 also includes arc-shaped centrifugal mass 102 and guidance plate 104. Mass 102 includes radially offset apertures 106 and 108. Guidance plate 104 includes annular ring 110 with radially offset protrusions 112 and 114 disposed in radially offset apertures 106 and 108, respectively.

Annular ring 110 includes raised portion 116 and radially offset protrusions 112 and 114 are disposed on the raised portion. Guidance plate 104 also includes inner cylindrical protrusion 118 on a radially inner side of the annular ring 110, and outer cylindrical protrusion 120 on a radially outer side of the annular ring. As shown in FIG. 1, inner cylindrical protrusion 118 and outer cylindrical protrusion 120 extend axially towards arc-shaped centrifugal mass 102. In other words, the arc-shaped centrifugal mass is arranged in a depressed area of the guidance plate formed between the inner and outer protrusions. A radial width of the annular ring is greater than a radial width of the arc-shaped centrifugal mass so that the location of the inner and outer cylindrical protrusions allow radial displacement of the arc-shaped centrifugal mass relative to the guidance plate.

The guidance plate includes annular ring 122 extending radially inward from the inner cylindrical protrusion. Annular ring 122 includes holes 124 for fixing the centrifugal mass assembly to a combustion engine. That is, the centrifugal mass assembly is designed for use with a centrifugal clutch. In such devices, when a speed of the combustion engine exceeds a predetermined threshold, the clutch engages to connect downstream components and, in one example, propel a motorcycle, for example. As such, the arc-shaped centrifugal mass is radially displaceable relative to the guidance plate. As can be seen in the section portion of FIG. 1, for example, a radial width of the radially offset apertures is greater than a radial width of the radially offset protrusions. Thus, as speed of the combustion engine is increased, a centrifugal force urging the arc-shaped centrifugal mass radially outwards is increased, and, due to the fact that the arc-shaped centrifugal mass is radially displaceable, the arc-shaped centrifugal mass moves radially outward to engage the clutch. Inner and outer radial displacement of the arc-shaped centrifugal mass may be limited by contact between the mass and the cylindrical protrusions, or by contact between the radially offset apertures and the radially offset protrusions, for example.

Centrifugal mass assembly 100 includes exactly three arc-shaped centrifugal masses 102 circumferentially arranged about central axis 101. Arc-shaped centrifugal mass 102 includes arc length 126 and radially offset apertures 106 and 108 are arranged at midpoint 128 of the arc length. Mass 102 also includes cutouts 130 and 132 arranged on opposite circumferential sides of radially offset apertures 106 and 108, or, otherwise stated, the cutouts are arranged on opposite circumferential sides of arc length midpoint 128. Mass 102 includes circumferentially distal ends 134 and 136 with radially inner notches 138 and 140. Guidance plate 104 includes cutouts 142 and 144 axially aligned with radially inner notches 138 and 140, respectively. When the assembly includes multiple arc-shaped centrifugal masses, the cutouts may be aligned with a pair of notches. For example, as shown in FIG. 1, cutout 142 is axially aligned with notch 138 of a first arc-shaped centrifugal mass, and notch 140 of a second, adjacent, arc-shaped centrifugal mass.

As shown in FIG. 3, for example, each of radially offset protrusions 112 and 114 is a tab formed from a portion of the annular ring and bent to extend in an axial direction. Prior to being bent, radially offset protrusion 112 is formed as a first tab extending radially inwards and radially offset protrusion 114 is formed as a second tab extending radially outwards. In other words, annular ring 110 is pierced to remove material around the tabs so that tab 112 is only connected to the annular ring at a radially outer portion and tab 114 is only connected to the annular ring at a radially inner portion. This method eliminates a need to install additional components to guide the arc-shaped centrifugal masses or perform a complex extrusion operation on the annular ring.

As shown in the section portion of FIG. 1, for example, arc-shaped centrifugal mass 102 includes thickness 146 and radially offset protrusions 112 and 114 include respective lengths 148 and 150 extending axially from the annular ring. Lengths 148 and 150 are less than thickness 146. In other words, the protrusions extend part way through the arc-shaped centrifugal mass but do not extend fully through the arc-shaped centrifugal mass. The protrusions limit circumferential displacement of the mass so that, under rotation, movement of the mass is in a substantially radial direction. That is, widths of the apertures are only slightly larger than widths of the protrusions, but radial lengths of the apertures are greater than radial lengths of the protrusions.

Figure 4:
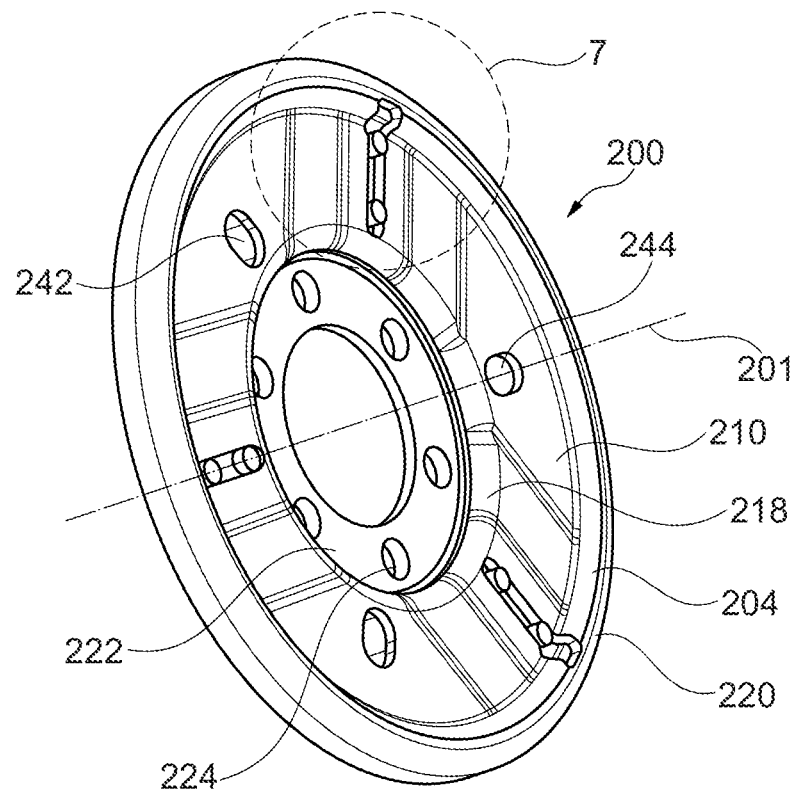
FIG. 4 illustrates a perspective view of a centrifugal mass assembly according to a second embodiment.
Figures 5, 6:
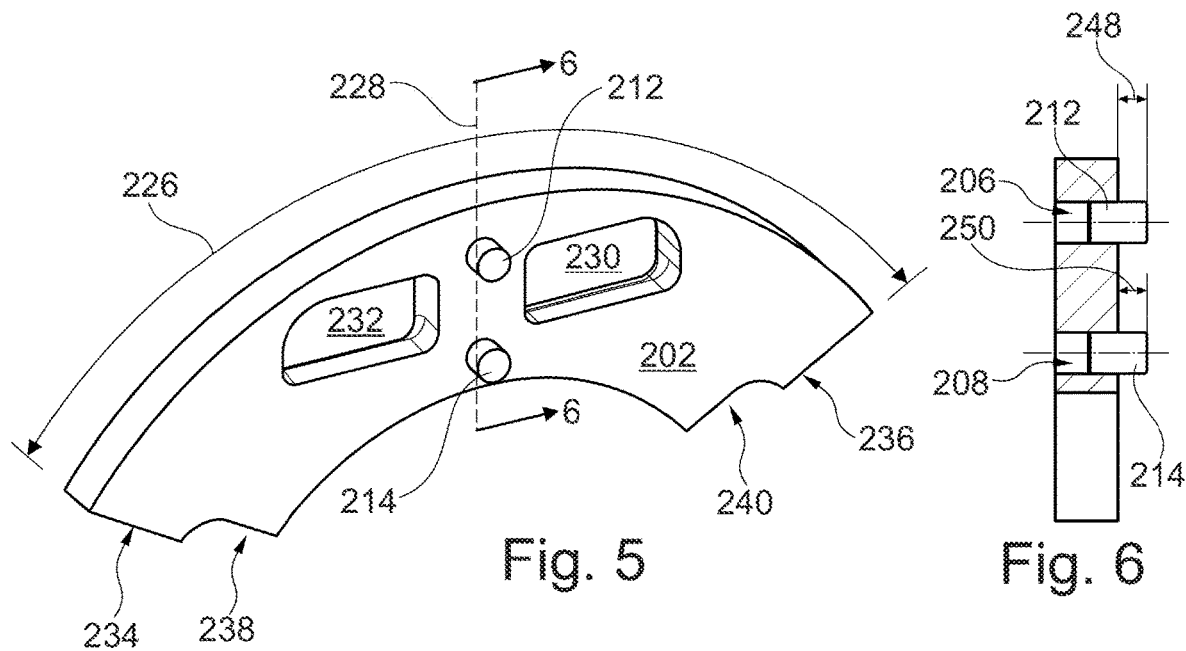
FIG. 5 illustrates a perspective view of an arc-shaped centrifugal mass for the centrifugal mass assembly of FIG. 4.
FIG. 6 illustrates a cross sectional view of the arc-shaped centrifugal mass of FIG. 5 taken generally along line 6-6 in FIG. 5.
Figure 7:
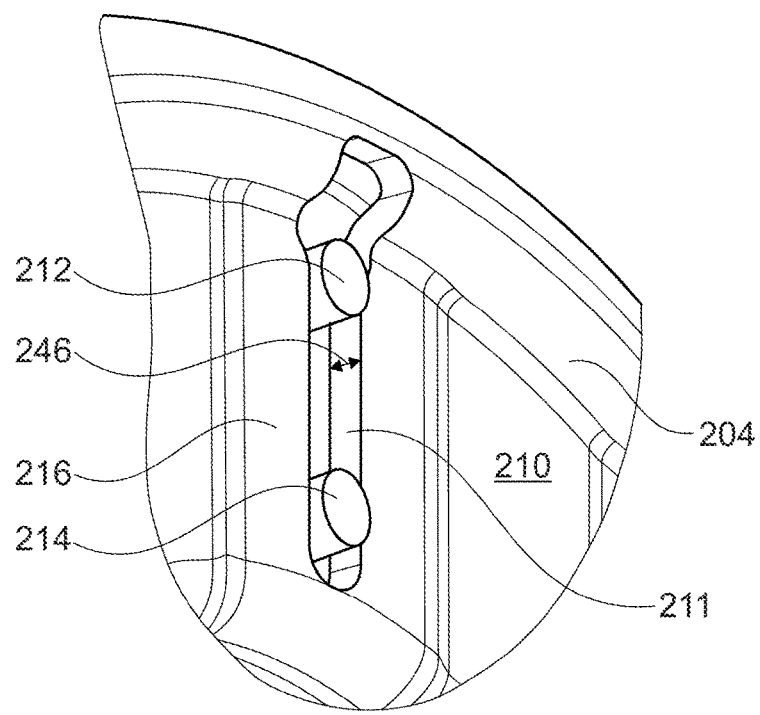
FIG. 7 illustrates a detail view of encircled region 7 in FIG. 4.

The following description is made with reference to FIGS. 4-7. FIG. 4 illustrates a perspective view of centrifugal mass assembly 200. FIG. 5 illustrates a perspective view of arc-shaped centrifugal mass 202 for centrifugal mass assembly 200 of FIG. 4. FIG. 6 illustrates a cross sectional view of the arc-shaped centrifugal mass of FIG. 5 taken generally along line 6-6 in FIG. 5. FIG. 7 illustrates a detail view of encircled region 7 in FIG. 4. Centrifugal mass assembly 200 may be used with a clutch as is known in the art. Centrifugal mass assembly 200 includes central axis 201. Throughout the description of assembly 200, the terms "radially", "axially" and "circumferentially" should be interpreted with regard to central axis 201. Assembly 200 also includes arc-shaped centrifugal mass 202 and guidance plate 204. Mass 202 includes radially offset apertures 206 and 208. Guidance plate 204 includes annular ring 210 with radially extending slot 211 and the arc-shaped centrifugal mass includes pins 212 and 214 fixed radially offset apertures 206 and 208, respectively, and disposed in radially extending slot 211.

Annular ring 210 includes raised portion 216 and slot 211 is disposed on the raised portion. Guidance plate 204 also includes inner cylindrical protrusion 218 on a radially inner side of the annular ring 210, and outer cylindrical protrusion 220 on a radially outer side of the annular ring. Inner cylindrical protrusion 218 and outer cylindrical protrusion 220 extend axially towards arc-shaped centrifugal mass 202. In other words, the arc-shaped centrifugal mass is arranged in a depressed area of the guidance plate formed between the inner and outer protrusions. A radial width of the annular ring is greater than a radial width of the arc-shaped centrifugal mass so that the location of the inner and outer cylindrical protrusions allow radial displacement of the arc-shaped centrifugal mass relative to the guidance plate.

The guidance plate includes annular ring 222 extending radially inward from the inner cylindrical protrusion. Annular ring 222 includes holes 224 for fixing the centrifugal mass assembly to a combustion engine. That is, the centrifugal mass assembly is designed for use with a centrifugal clutch. In such devices, when a speed of the combustion engine exceeds a predetermined threshold, the clutch engages to connect downstream components and, in one example, propel a motorcycle, for example. As such, the arc-shaped centrifugal mass is radially displaceable relative to the guidance plate. As can be seen in FIG. 7, for example, a radial width of the slot is greater than a radial extent of the pins disposed in the radially offset apertures. Thus, as speed of the combustion engine is increased, a centrifugal force urging the arc-shaped centrifugal mass radially outwards is increased, and, due to the fact that the arc-shaped centrifugal mass is radially displaceable, the arc-shaped centrifugal mass moves radially outward to engage the clutch. Inner and outer radial displacement of the arc-shaped centrifugal mass may be limited by contact between the mass and the cylindrical protrusions, or by contact between the slot and the pins, for example.

Centrifugal mass assembly 200 includes exactly three arc-shaped centrifugal masses 202 circumferentially arranged about central axis 201. Arc-shaped centrifugal mass 202 includes arc length 226 and radially offset apertures 206 and 208 are arranged at midpoint 228 of the arc length. Mass 202 also includes cutouts 230 and 232 arranged on opposite circumferential sides of radially offset apertures 206 and 208, or, otherwise stated, the cutouts are arranged on opposite circumferential sides of arc length midpoint 228. Mass 202 includes circumferentially distal ends 234 and 236 with radially inner notches 238 and 240. Guidance plate 204 includes cutouts 242 and 244 axially aligned with radially inner notches 238 and 240, respectively. When the assembly includes multiple arc-shaped centrifugal masses, the cutouts may be aligned with a pair of notches. For example, as shown in FIG. 4, cutout 242 is axially aligned with notch 238 of a first arc-shaped centrifugal mass, and notch 240 of a second, adjacent, arc-shaped centrifugal mass.

As shown in FIG. 7, for example, guidance plate 204 includes outer cylindrical protrusion 220 on a radially outer side of annular ring 210 and radially extending slot 211 extends through the outer cylindrical protrusion. Pins 212 and 214 are disposed in slot 211 and extend axially beyond annular ring 210. In other words, annular ring 210 includes thickness 246 and pins 212 and 214 include respective lengths 248 and 250 axially away from the arc-shaped centrifugal mass. Lengths 248 and 250 are greater than thickness 246.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Centrifugal mass assembly
101 Central axis
102 Arc-shaped centrifugal mass
104 Guidance plate
106 Radially offset aperture (first)
108 Radially offset aperture (second)
110 Annular ring (first)
112 Radially offset protrusion (first)
114 Radially offset protrusion (second)
116 Raised portion
118 Inner cylindrical protrusion
120 Outer cylindrical protrusion
122 Annular ring (second)
124 Holes
126 Arc length
128 Midpoint (of arc length)
130 Cutout (first)
132 Cutout (second)
134 Distal end (first)
136 Distal end (second)
138 Notch (first)
140 Notch (second)
142 Cutout (first)
144 Cutout (second)
146 Thickness
148 Length (first protrusion)
150 Length (second protrusion)
200 Centrifugal mass assembly
201 Central axis
202 Arc-shaped centrifugal mass
204 Guidance plate
206 Radially offset aperture (first)
208 Radially offset aperture (second)
210 Annular ring (first)
211 Radially extending slot
212 Pin (first)

214 Pin (second)
216 Raised portion
218 Inner cylindrical protrusion
220 Outer cylindrical protrusion
222 Annular ring (second)
224 Holes
226 Arc length
228 Midpoint (of arc length)
230 Cutout (first)
232 Cutout (second)
234 Distal end (first)
236 Distal end (second)
238 Notch (first)
240 Notch (second)
242 Cutout (first)
244 Cutout (second)
246 Thickness
248 Length (first pin)
250 Length (second pin)

What is claimed is:

1. A centrifugal mass assembly for a clutch, comprising:
a central axis;
an arc-shaped centrifugal mass comprising a pair of radially offset apertures; and
a guidance plate comprising a first annular ring, wherein:
the first annular ring comprises a pair of radially offset protrusions disposed in respective ones of the pair of radially offset apertures; or
the first annular ring comprises a radially extending slot and the arc-shaped centrifugal mass further comprises a pair of pins fixed in respective ones of the pair of radially offset apertures and disposed in the radially extending slot.

2. The centrifugal mass assembly of claim 1 wherein:
the first annular ring comprises a raised portion; and
the pair of radially offset protrusions or the radially extending slot is disposed on the raised portion.

3. The centrifugal mass assembly of claim 1 wherein the guidance plate further comprises:
an inner cylindrical protrusion on a radially inner side of the first annular ring; and
an outer cylindrical protrusion on a radially outer side of the first annular ring.

4. The centrifugal mass assembly of claim 3 wherein the inner cylindrical protrusion and the outer cylindrical protrusion extend axially towards the arc-shaped centrifugal mass.

5. The centrifugal mass assembly of claim 3 wherein the guidance plate further comprises a second annular ring extending radially inward from the inner cylindrical protrusion.

6. The centrifugal mass assembly of claim 5 wherein the second annular ring comprises a plurality of holes for fixing the centrifugal mass assembly to a combustion engine.

7. The centrifugal mass assembly of claim 1 wherein the arc-shaped centrifugal mass is radially displaceable relative to the guidance plate.

8. The centrifugal mass assembly of claim 1 comprising exactly three arc-shaped centrifugal masses circumferentially arranged about the central axis.

9. The centrifugal mass assembly of claim 1 wherein:
the arc-shaped centrifugal mass comprises an arc length; and
the pair of radially offset apertures are arranged at a midpoint of the arc length.

10. The centrifugal mass assembly of claim 9 wherein the arc-shaped centrifugal mass further comprises a pair of cutouts arranged on opposite circumferential sides of the pair of radially offset apertures.

11. The centrifugal mass assembly of claim 1 wherein the arc-shaped centrifugal mass further comprises circumferentially distal ends with radially inner notches.

12. The centrifugal mass assembly of claim 11 wherein the guidance plate comprises cutouts axially aligned with the radially inner notches.

13. The centrifugal mass assembly of claim 1 wherein:
the first annular ring comprises the pair of radially offset protrusions disposed in respective ones of the pair of radially offset apertures; and
each one of the pair of radially offset protrusions is a tab formed from a portion of the first annular ring and bent to extend in an axial direction.

14. The centrifugal mass assembly of claim 13 wherein, prior to being bent:
a first one of the pair of radially offset protrusions is formed as a first tab extending radially inwards; and
a second one of the pair of radially offset protrusions is formed as a second tab extending radially outwards.

15. The centrifugal mass assembly of claim 1 wherein:
the first annular ring comprises the pair of radially offset protrusions disposed in respective ones of the pair of radially offset apertures;
the arc-shaped centrifugal mass comprises a thickness; and
the pair of radially offset protrusions comprise respective lengths extending axially from the first annular ring that are less than the thickness.

16. The centrifugal mass assembly of claim 1 wherein:
the first annular ring comprises the radially extending slot;
the guidance plate further comprises an outer cylindrical protrusion on a radially outer side of the first annular ring; and
the radially extending slot extends through the outer cylindrical protrusion.

17. The centrifugal mass assembly of claim 1 wherein the arc-shaped centrifugal mass comprises the pair of pins:
fixed in respective ones of the pair of radially offset apertures;
disposed in the radially extending slot; and
extending axially beyond the first annular ring.

18. The centrifugal mass assembly of claim 1 wherein:
the arc-shaped centrifugal mass comprises the pair of pins fixed in respective ones of the pair of radially offset apertures and disposed in the radially extending slot;
the first annular ring comprises a thickness; and
the pair of pins comprise respective lengths extending axially away from the arc-shaped centrifugal mass that are greater than the thickness.

* * * * *